United States Patent
Yamazaki et al.

(10) Patent No.: US 7,078,668 B2
(45) Date of Patent: Jul. 18, 2006

(54) PHOTOELECTRIC CONVERSION APPARATUS

(75) Inventors: Kazuo Yamazaki, Kanagawa (JP); Hidekazu Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 10/360,927

(22) Filed: Feb. 10, 2003

(65) Prior Publication Data

US 2003/0150977 A1    Aug. 14, 2003

(30) Foreign Application Priority Data

Feb. 13, 2002    (JP) .............. 2002-035643

(51) Int. Cl.
*H01L 27/00* (2006.01)
*H01L 31/00* (2006.01)

(52) U.S. Cl. .............. 250/208.1; 250/214.1; 250/214 L; 257/290; 327/514

(58) Field of Classification Search ............ 250/208.1, 250/214.1, 214 R, 214 L, 214 A, 214 LA; 257/290–292; 348/294, 300, 302; 330/308, 330/110; 327/514, 515
See application file for complete search history.

(56) References Cited

U.S. PATENT DOCUMENTS

| | | | | |
|---|---|---|---|---|
| 4,599,715 A | * | 7/1986 | Beard | 369/124.11 |
| 4,774,401 A | * | 9/1988 | Yamada et al. | 250/201.2 |
| 5,252,864 A | * | 10/1993 | Kooijman | 327/350 |
| 5,698,844 A | | 12/1997 | Shinohara et al. | 250/214 R |
| 5,786,588 A | | 7/1998 | Takahashi | 250/208.1 |
| 5,955,753 A | | 9/1999 | Takahashi | 257/292 |
| 6,147,338 A | | 11/2000 | Takahashi | 250/208.1 |
| 2002/0020845 A1 | | 2/2002 | Ogura et al. | 257/88 |
| 2002/0067416 A1 | | 6/2002 | Yoneda et al. | 348/304 |
| 2002/0113888 A1 | | 8/2002 | Sonoda et al. | 348/315 |

\* cited by examiner

*Primary Examiner*—Kevin Pyo
(74) *Attorney, Agent, or Firm*—Fitzpatrick, Cella, Harper & Scinto (57) ABSTRACT

A photoelectric conversion apparatus includes a photoelectric conversion element and a logarithmic conversion unit for converting a signal from the photoelectric conversion element to a logarithmically compressed voltage by means of a diode characteristic of p-n junction. The p-n junction in the logarithmic conversion unit is composed of any two terminals of the emitter, the base and the collector of the bipolar transistor, and a residual terminal of the transistor is connected to a semiconductor substrate.

9 Claims, 7 Drawing Sheets

PRIOR ART

FIG. 9

PRIOR ART

FIG. 10

PRIOR ART

FIG. 11

PHOTOELECTRIC CONVERSION APPARATUS

BACKGROUND OF THE INVENTION

1. Field of the Invention

The present invention relates to an photoelectric conversion apparatus for receiving an optical signal from a subject, and an image pickup device using the photoelectric conversion apparatus.

2. Related Background Art

Some photoelectric conversion apparatus output a signal having an amplitude proportional linearly to the quantity of input light, and other photoelectric conversion apparatus output a signal having an amplitude obtained by converting the quantity of input light logarithmically. One type of the latter logarithmic compression photoelectric conversion apparatus utilizes a logarithmic amplifier (hereinafter referred to as a LOG amp).

Figure 10:
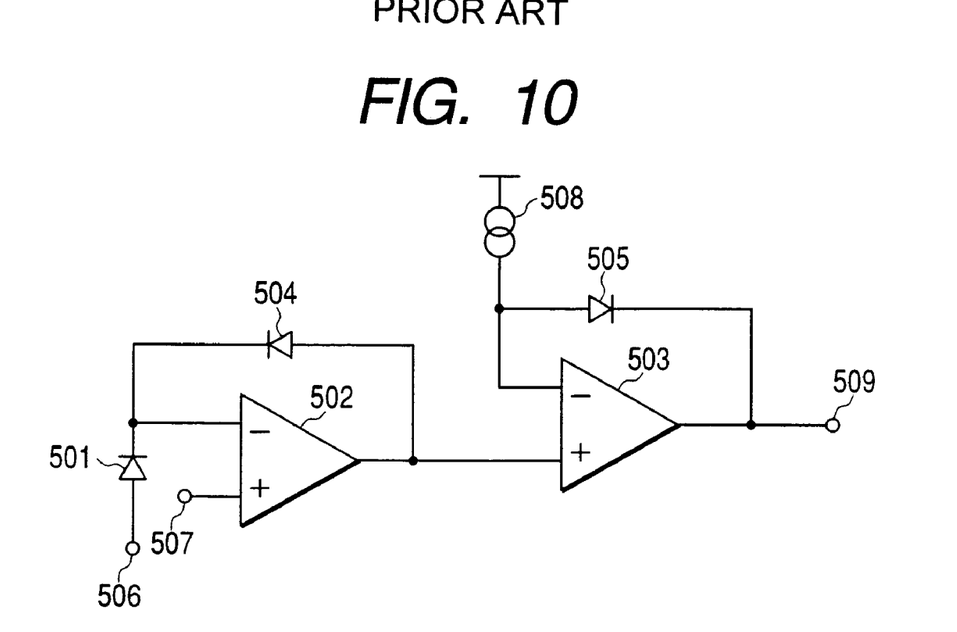
FIG. 10 is an equivalent circuit diagram using diodes in related art.

FIG. 10 shows a conventional logarithmic compression photoelectric conversion apparatus using a LOG amp. In the figure, a reference numeral 501 designates a photodiode; reference numerals 502 and 503 designate an operational amplifier (hereinafter referred to as an OP amp) severally; reference numerals 504 and 505 designate a diode severally; reference numerals 506 and 507 designate a constant voltage input terminal severally; a reference numeral 508 designates a constant current source; and a reference numeral 509 designates an output terminal.

The voltage at the cathode terminal of the photodiode 501 is the voltage at the constant voltage input terminal (the reference input terminal) 507 of the OP amp 502 owing to the imaginary short of the OP amp 502. The voltage at the constant voltage input terminal 507 is designated by a reference character Vc here. If the voltage at the anode terminal of the photodiode 501 is equal to the voltage Vc or less, the photodiode 501 is reversely biased.

When light enters the photodiode 501, a photoelectric current Ip proportional to the incident light flows through the photodiode 501. The photoelectric current Ip flows from the output terminal of the OP amp 502 to the constant voltage input terminal 506 through the diode 504 and the photodiode 501 in order.

In this case, supposing that the voltage at the constant voltage input terminal 507 is Vc and the voltage of the output terminal of the OP amp 502 is V1, the voltage V1 can be expressed:

$$V1 = (qT/k) \times \ln(Ip/Is) + Vc \quad \text{Expression 1}$$

where Is designates the reverse direction saturation current of the diode 504.

That is, the OP amp 502 outputs the output proportional to the logarithm of the quantity of the entered light (the photoelectric current Ip). Consequently, an input/output characteristic having a wide dynamic range can be obtained.

Moreover, the circuit comprising the diode 505, the OP amp 503, the constant current source 508 and the output terminal 509 is a circuit for compensating the dispersion of the reverse direction saturation current Is of the diode 504. Supposing that the voltage of the output terminal 509 is designated by a reference character Vout and the current flowing to the constant current source 508 is designated by a reference character Iref, the following expression can be obtained.

$$Vout = -(qT/k) \times \ln(Iref/Is) + V1$$

By putting the expression 1 in the place of V1, and by supposing that the characteristics of the two diodes 504 and 505 are the same, the following expression can be obtained.

$$Vout = (qT/k) \times \ln(Ip/Is) - (qT/k) \times \ln(Iref/Is) = (qT/k) \times \ln(Ip/Iref) \quad \text{Expression 2}$$

Consequently, the output voltage Vout, which does not depend on the reverse direction saturation current of the diode 504, can be obtained.

Figure 11:
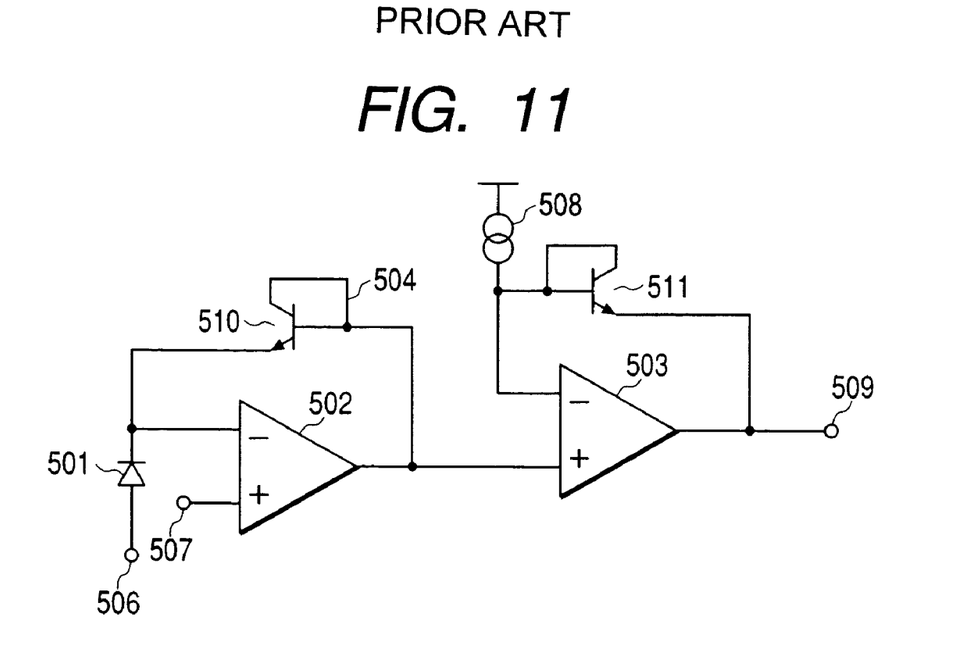
FIG. 11 is an equivalent circuit diagram using bipolar transistors in related art.

As the diode 504 in this example, a bipolar transistor 510 connected in a diode connection is generally used as shown in FIG. 11.

Figure 9:
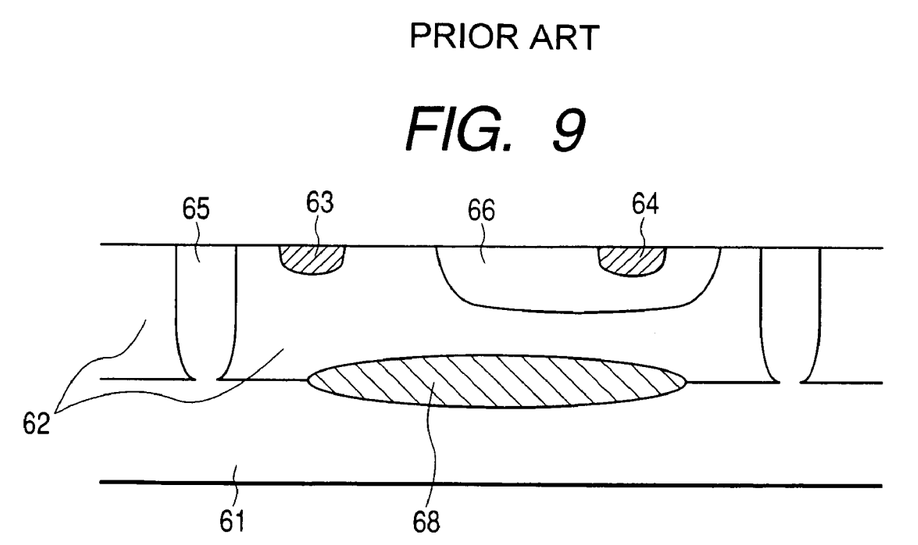
FIG. 9 is a sectional view showing the structure of a cross section of a bipolar transistor for logarithmic conversion in related art.

FIG. 9 is a sectional view showing the structure of a cross section of a conventional bipolar transistor to be used in a photoelectric conversion apparatus. In the figure, a reference numeral 61 designates a p-type semiconductor substrate; a reference numeral 62 designates an n-type epitaxial layer used as a collector region; a reference numeral 63 is a p-type base diffusion layer; a reference numeral 64 designates an n-type emitter diffusion layer; a reference numeral 66 designates an n-type diffusion layer for taking out the collector region; a reference numeral 65 designates p-type diffusion layer; and a reference numeral 68 designates an n-type embedded diffusion layer. These components constitute an NPN transistor having the collector region of the n-type epitaxial layer 62, the base region of the p-type base diffusion layer 63, and the emitter region of the n-type emitter diffusion layer 64. By adopting the structure described above, it becomes possible to separate electrically the bipolar transistor from the semiconductor substrate 61. Incidentally, if such a bipolar transistor is used as a p-n junction diode simply, the bipolar transistor can be used equivalently as p-n junction diode by connecting the collector and the base of the transistor in common.

However, because the bipolar transistor is used as the p-n junction diode by connecting the collector and the base of the transistor in common, each terminal of the emitter, the collector and the base of the bipolar transistor is used at intermediate voltages, which are neither power supply voltages nor the ground voltage.

Accordingly, it is necessary to adopt a device structure in which each terminal is separated from a substrate. The structure makes the manufacturing process of such a transistor having the structure be complicated, and the costs of the manufacturing increase.

SUMMARY OF THE INVENTION

An object of the present invention is to simplify the manufacturing process of a semiconductor.

Another object of the invention is to improve the performances of a photoelectric conversion apparatus.

For attaining the objects, an aspect of the present invention provides a photoelectric conversion apparatus including: a photoelectric conversion element; and a logarithmic conversion unit which converts a signal from the photoelectric conversion element to a logarithmically compressed voltage by means of a diode characteristic of a p-n junction; wherein the p-n junction in the logarithmic conversion unit is composed of any two terminals of an emitter, a base and a collector of a bipolar transistor, and a residual terminal of the bipolar transistor is connected to a semiconductor substrate.

Moreover, another aspect of the present invention provides a photoelectric conversion apparatus including: a photoelectric conversion element; and a logarithmic conversion unit which converts a current from the photoelectric conversion element to a logarithmically compressed voltage, wherein the logarithmic conversion unit performs logarithmic conversion by means of a diode characteristic of a diode formed by junction of a first semiconductor region of a first conductivity type with a second semiconductor region of a conductivity type opposite to the first conductivity type, the second semiconductor region is formed by being joined to a semiconductor substrate of the first conductivity type on which the logarithmic conversion unit is formed, and the photoelectric conversion element and the logarithmic compression unit are formed on the same semiconductor substrate in accordance with a CMOS process.

Moreover, a further aspect of the present invention provides a photoelectric conversion apparatus including: a photoelectric conversion element; a logarithmic conversion unit which converts a signal from the photoelectric conversion element to a logarithmically compressed voltage; an inversion element which inverts a polarity of an output from the logarithmic conversion unit; and a correction element which corrects a diode characteristic of a p-n junction in the photoelectric conversion element.

The other objects and characteristics of the present invention will be clear from the following description and the attached drawings.

DESCRIPTION OF THE PREFERRED EMBODIMENTS

In the following, the preferred embodiments of the present invention will be described in detail by reference to the attached drawings.

Embodiment 1

Figure 1:
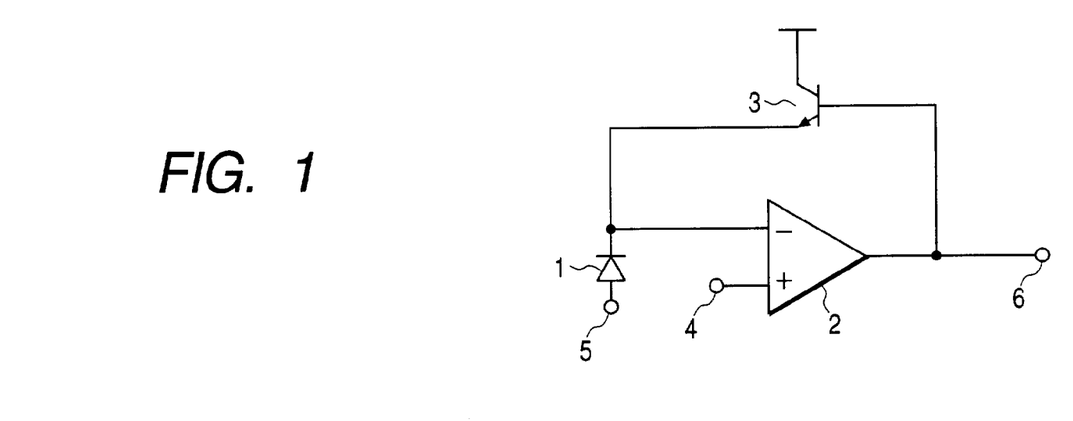
FIG. 1 is a diagram showing a photoelectric conversion apparatus of a first embodiment according to the present invention.

In FIG. 1, a reference numeral 1 designates a photodiode for outputting a current proportional to a photoelectric current; a reference numeral 2 designates an operational amplifier (hereinafter referred to as an OP amp) having a CMOS structure; and a reference numeral 3 designates an NPN transistor. The collector terminal of the NPN transistor 3 is connected to a power source, and the base terminal and the emitter terminal thereof are respectively connected to the output terminal and one input terminal of the OP amp 2. The base terminal and the emitter terminal constitute a feedback loop. In addition, reference numerals 4 and 6 designate a reference input terminal and an output terminal, respectively.

The collector terminal of the bipolar transistor 3 is connected to a substrate in a semiconductor substrate. Because the electric potential of the substrate is the voltage of the power source, the collector terminal of the NPN transistor is fixed to the voltage of the power source. The base terminal and the emitter terminal constitute a p-n junction.

The cathode terminal of the photodiode 1 is connected to a negative input terminal of the OP amp 2. The voltage of this terminal is the voltage of the reference input terminal 4 owing to the imaginary short between the terminals. The voltage of the reference input terminal 4 is referred to hereinafter as Vc. The photodiode is reversely biased when a voltage equal to or less than the voltage Vc is applied to the anode terminal of the photodiode 1.

When light enters the photodiode 1, a photoelectric current Ip proportional to the entered light flows through the photodiode 1. The photoelectric current Ip is supplied from the output terminal of the OP amp 2 to flow to a constant voltage input terminal 5 through the p-n junction of the bipolar transistor 3 and the photodiode 1 in order.

In this case, supposing that the voltage at the reference input terminal 4 is Vc and the voltage of the output terminal of the OP amp 2 is V1, the voltage V1 can be expressed:

$$V1=(qT/k)\times \ln(Ip/Is)+Vc \qquad \text{Expression 1}$$

That is, the OP amp 2 outputs the output proportional to the logarithm of the quantity of the entered light (the photoelectric current Ip) even if the collector terminal of the NPN transistor 3 is connected to the substrate to fix the voltage of the collector to the voltage of the power supply. Consequently, an input/output characteristic having a wide dynamic range can be obtained. Here, the reference character Is designates the reverse direction saturation current of the p-n junction of the transistor 3.

Figure 8:
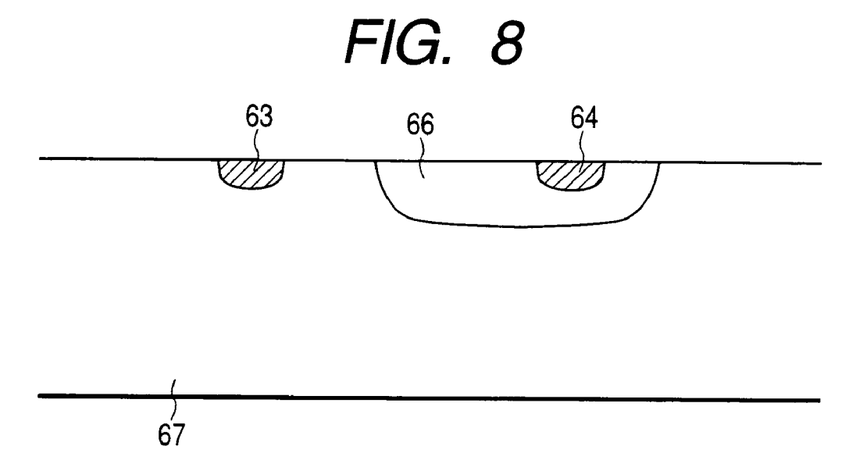
FIG. 8 is a sectional view showing the structure of a cross section of a bipolar transistor for logarithmic conversion in the present invention.

FIG. 8 is a sectional view showing the structure of a cross section of the bipolar transistor 3 in the present embodiment. In the figure, the same components as those shown in FIG. 9 are designated by the same reference numerals as those in FIG. 9, and their descriptions are omitted.

A reference numeral 67 designates an n-type semiconductor substrate, which is electrically connected with an n-type diffusion layer 66 for taking out the collector region. Generally, the n-type semiconductor substrate is used as a terminal of the power voltage. That is, the collector terminal of the NPN transistor, which is structured in the way shown in FIG. 8 and has a collector region 67, a base region 63 and an emitter region 64, is connected with the voltage of the power supply.

The present embodiment is characterized in that the collector of the bipolar transistor 3 is made in common with the semiconductor substrate 67. Thereby, the number of masks in the manufacturing process of a semiconductor can be decreased and the simplification of the process is realized.

According to the present embodiment, a logarithmically compressing output type photoelectric conversion apparatus capable of simplifying the manufacturing process thereof can be realized. In addition, because the photoelectric conversion apparatus has a good matching property with the CMOS manufacturing process, it is also possible to realize the integration of various peripheral circuits onto a chip.

Figure 5:
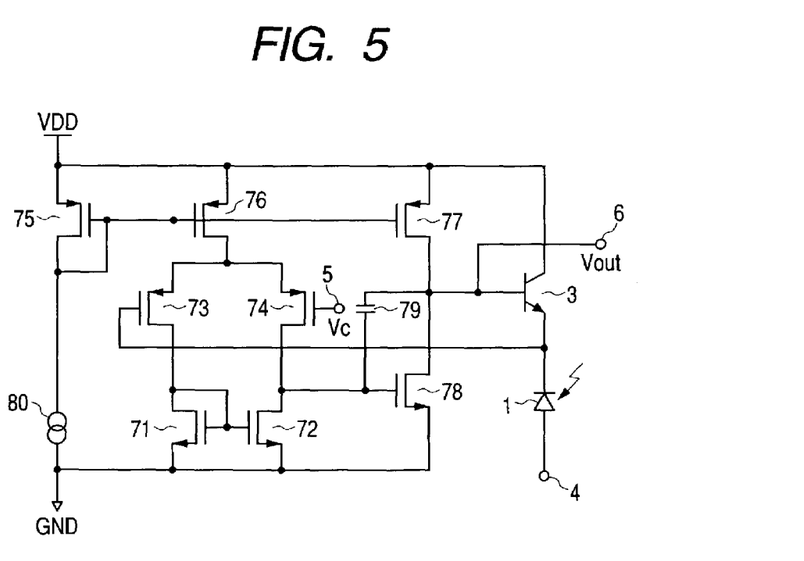
FIG. 5 is a diagram showing an equivalent circuit of a circuit which is realized by means of a complementary metal-oxide semiconductor (CMOS) manufacturing process.

FIG. 5 is a diagram showing the most basic equivalent circuit of the circuit of the present embodiment provided by means of the CMOS manufacturing process. In the figure, the components same as those in FIG. 1 are designated by the same reference numerals in FIG. 1, and their descriptions are omitted. Reference numerals 71, 72 and 78 designates an n-channel metal oxide semiconductor (NMOS) transistor severally; reference numerals 73, 74, 75, 76 and 77 designate a p-channel metal oxide semiconductor (PMOS) transistor severally; a reference numeral 79 designates a capacitor; and a reference numeral 80 designates a constant current source. The embodiment uses the NPN transistor 3 for logarithmic compression conversion, whose collector terminal is connected to the power supply, and the OP amp 2 is composed of the NMOS transistors 71, 72 and 78, the PMOS transistors 73–77 and the capacitor 79, all capable of being produced by means of the CMOS manufacturing process. Consequently, it is possible to simplify the manufacturing process, and it is also possible to realize the integration of various peripheral circuits onto a chip.

Embodiment 2

Figure 2:
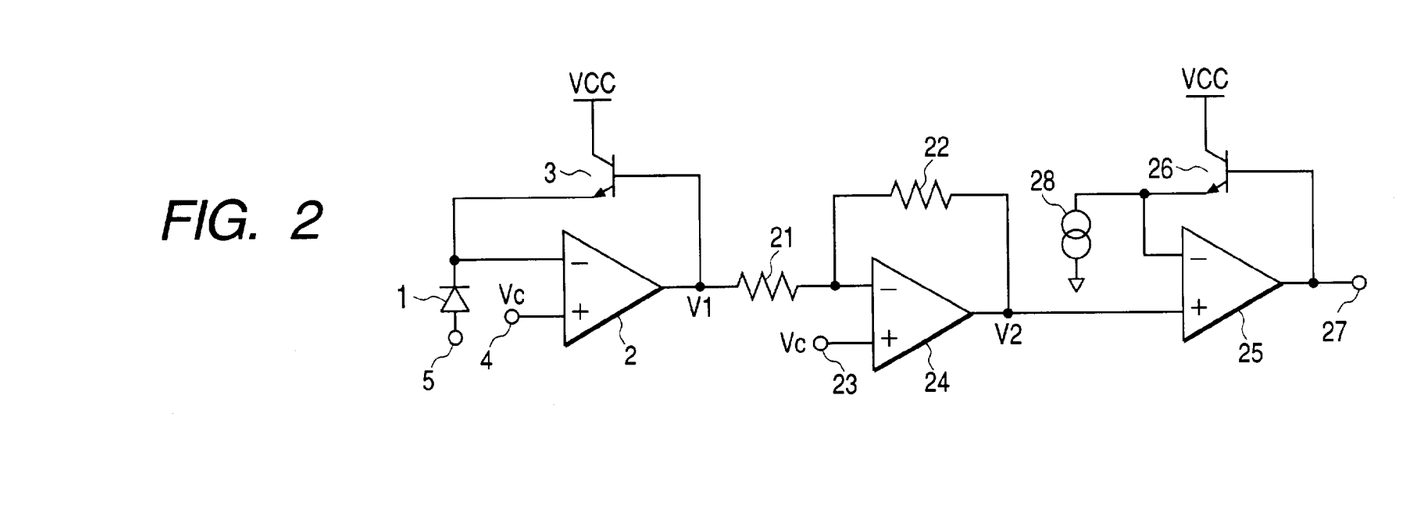
FIG. 2 a diagram showing a photoelectric conversion apparatus of a second embodiment according to the present invention.

FIG. 2 shows a schematic circuit diagram of an photoelectric conversion apparatus of a second embodiment according to the present invention. In the figure, the same components as those in FIG. 1 are designated by the same reference numerals, and their descriptions are omitted.

The intermediate voltage V1 can be expressed similarly to Embodiment 1.

$$V1=(qT/k)\times\ln(Ip/Is)+Vc \quad\quad \text{Expression 1}$$

The circuit composed of resistors 21 and 22 and an OP amp 24 is an inversion amplifying circuit. Supposing that the resistance values of the resistors 21 and 22 are respectively R1 and R2, an intermediate voltage V2 of the OP amp 24 is expressed as follows.

$$V2=(R1/R2)\times(Vc-V1)+Vc$$

Supposing that R1=R2, and by putting the Expression 1 in the place of V1, the following expression can be obtained.

$$V2=Vc-(qT/k)\times\ln(Ip/Is) \quad\quad \text{Expression 3}$$

Moreover, a circuit comprising an NPN transistor 26, an OP amp 25, a constant current source 28 and an output terminal 27 is a circuit for compensating the dispersion of the reverse direction saturation current Is of the p-n junction of the transistor 3. Supposing that the voltage of the output terminal 27 is designated by a reference character Vout and the current flowing to the constant current source 28 is designated by a reference character Iref, the following expression can be obtained.

$$Vout=(qT/k)\times\ln(Iref/Is)+V2$$

By putting the Expression 3 in the place of V2, and by supposing that the characteristics of the two bipolar transistors 3 and 26 are the same, the following expression can be obtained.

$$Vout=(qT/k)\times\ln(Iref/Is)-((qT/k)\times\ln(Ip/Is)+Vc)=Vc-(qT/k)\times\ln(Ip/Iref) \quad\quad \text{Expression 4}$$

Consequently, the output voltage Vout, which does not depend on the reverse direction saturation current Is of the p-n junction of the transistor 3, can be obtained.

In the present embodiment, the polarity of the output of the photoelectric conversion section is inverted by the inverting amplifier having the gain of minus one times. After that, the reverse direction saturation current Is of the bipolar transistor 3 is compensated. Consequently, it is possible to compensate the reverse direction saturation current Is similarly in the related art even in the case of using the NPN transistor 3 having the collector terminal connected to the power supply. That is, it is possible to perform the same compensation as that in the related art even in the simplified manufacturing process.

Embodiment 3

Figure 3:
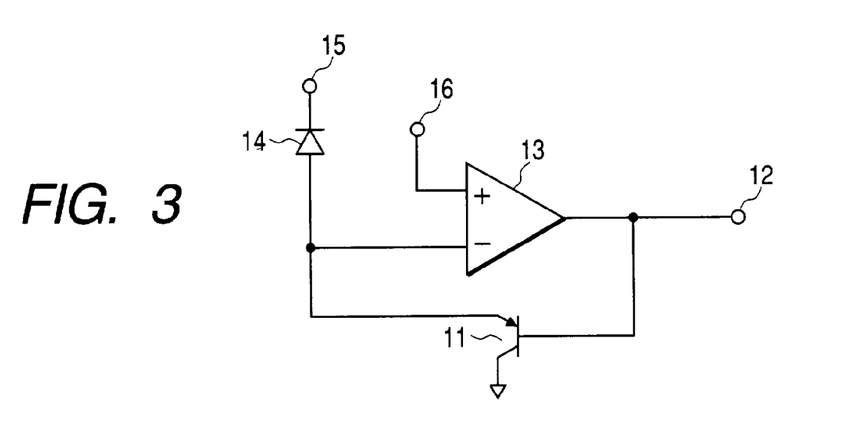
FIG. 3 is a diagram showing a photoelectric conversion apparatus of a third embodiment according to the present invention.

FIG. 3 shows a schematic circuit diagram of an photoelectric conversion apparatus of a third embodiment according to the present invention. In the figure, a reference numeral 14 designates a photodiode for outputting a current proportional to corresponding to incident light; a reference numeral 13 designates an operational amplifier (OP amp); and a reference numeral 11 designates a PNP transistor. The collector terminal of the PNP transistor 11 is connected with the ground. The emitter terminal and the base terminal of the PNP transistor 11 are respectively connected to a negative input terminal and the output terminal of the OP amp 13. The base terminal and the emitter terminal constitute a feedback loop. In addition, reference numerals 15 and 16 designate a constant voltage input terminal and a reference input terminal, respectively. A reference numeral 12 designates an output terminal.

The collector terminal of the PNP transistor 11 is connected to a substrate in a semiconductor substrate. Because the electric potential of the substrate is the voltage of the power source, the collector terminal of the PNP transistor is fixed to the ground level. The base terminal and the collector terminal constitute an n-p junction.

The anode terminal of the photodiode 14 is connected to the negative input terminal of the OP amp 13. The voltage of this terminal is the voltage of the reference input terminal 16 owing to the imaginary short between the terminals. The voltage of the reference input terminal 16 is referred to hereinafter as Vc. The photodiode is reversely biased when a voltage equal to or less than the voltage Vc is applied to the cathode terminal of the photodiode 14.

When light enters the photodiode 14, a photoelectric current Ip proportional to the entered light flows through the photodiode 14. The photoelectric current Ip is supplied to the output terminal 12 of the OP amp 13 through the p-n junction of the PNP transistor 11.

In this case, supposing that the voltage at the reference input terminal 16 is Vc and the voltage of the output terminal 12 of the OP amp 13 is V1, the voltage V1 can be expressed:

$$V1=Vc-(qT/k)\times\ln(Ip/Is)$$

That is, the OP amp 13 outputs the output proportional to the logarithm of the quantity of the entered light (the photoelectric current Ip) even if the collector terminal of the PNP transistor 11 is connected to the substrate to fix the voltage of the collector to the ground level. Consequently, an input/output characteristic having a wide dynamic range can be obtained. Here, the reference character Is designates the reverse direction saturation current of the p-n junction of the transistor 11.

According to the present embodiment, a logarithmically compressing output type photoelectric conversion apparatus capable of simplifying the manufacturing process thereof can be realized. In addition, because the photoelectric conversion apparatus has a good matching property with the CMOS manufacturing process, it is also possible to realize the integration of various peripheral circuits onto a chip.

Figure 4:
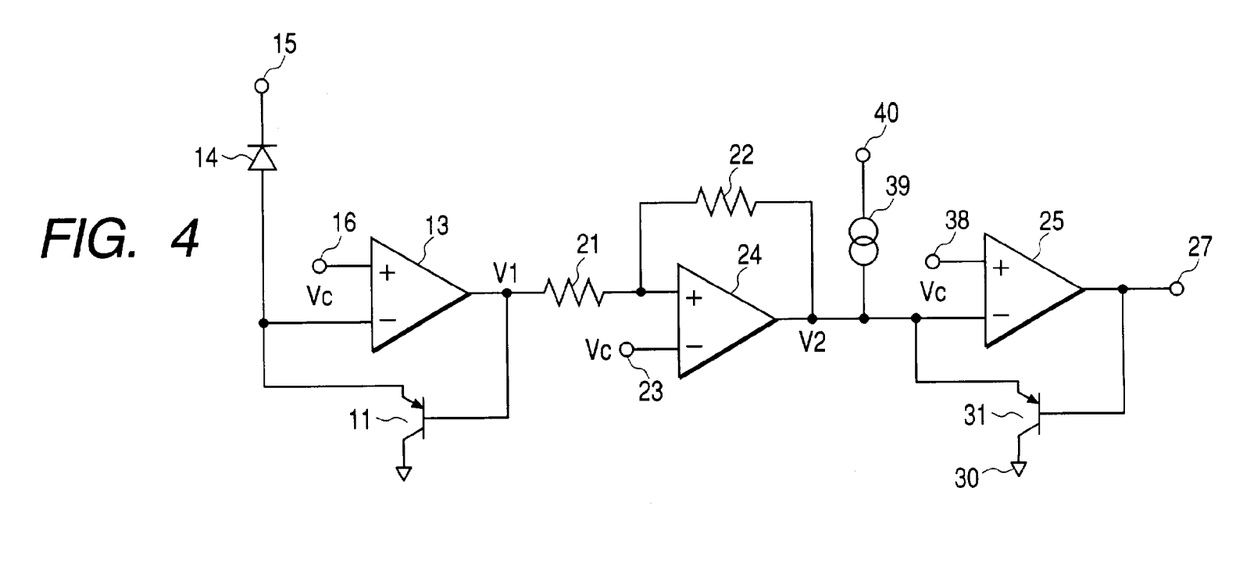
FIG. 4 is a diagram showing another photoelectric conversion apparatus of the third embodiment according to the present invention.

In addition, it is needless to say that an output which does not depend on the reverse direction saturation current Is of the p-n junction of the transistor 11 can be obtained also in the present embodiment as well as in the Embodiment 2 by adding an inversion amplifying circuit and a circuit for compensating the dispersion of the reverse direction saturation current Is as shown in FIG. 4.

Embodiment 4

A solid-state image pickup device for distance measurement and photometry equipped with one of the photometry circuit blocks described in connection with the Embodiments 1 to 3 will be described.

Figure 6:
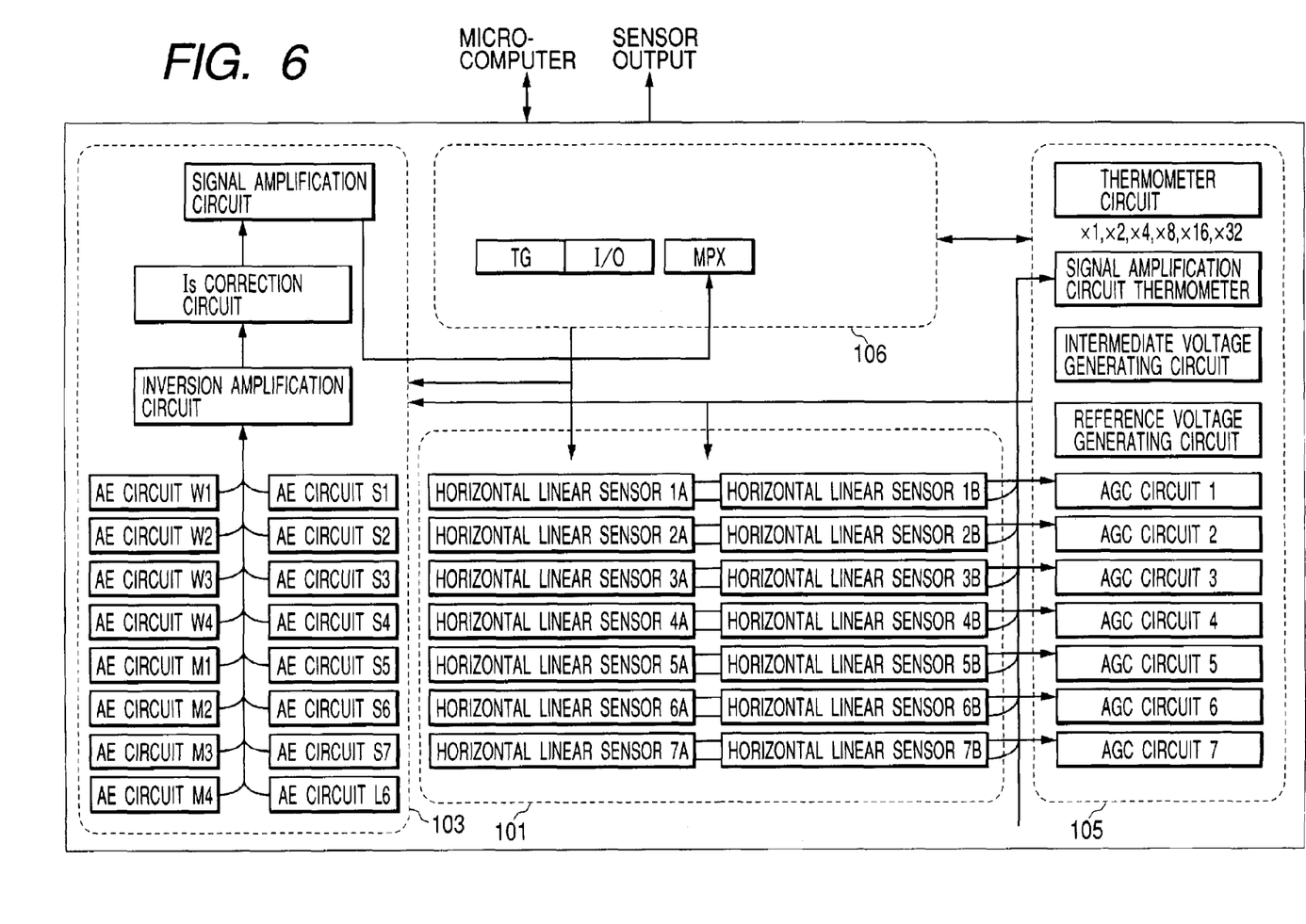
FIG. 6 is a conceptual block diagram of a solid-state image pickup device for distance measurement and photometry of a fourth embodiment according to the present invention.

FIG. 6 is a conceptual block diagram of a solid-state image pickup apparatus for distance measurement and photometry equipped with one of the photometry circuit blocks described in connection with the Embodiments 1–3.

An automatic focusing (AF) circuit block 101 is composed of seven pairs of linear sensors for automatic focusing in which automatic focusing is performed at seven positions. The automatic focusing can be implemented in a triangular distance measuring method by the use of two linear sensors.

An automatic exposure (AE) circuit 103 is composed of sixteen logarithmic compression type AE sensors, an inversion amplification circuit, an Is correction circuit and a signal amplification circuit. The AE circuit 103 enables fine exposure control by dividing an image pickup area into sixteen blocks.

An analog block 105 is composed of an automatic gain control (AGC) circuit for controlling the accumulation time of the automatic focusing sensors, a band gap circuit for generating a reference voltage, a power supply circuit for generating intermediate voltages such as VRES, VGR and the like necessary for the sensor circuits, a signal amplification circuit for amplifying a signal to be output to the outside, and a thermometer circuit for observing the temperature of a substrate.

A digital block 106 is composed of a timing generation (TG) circuit for driving the sensors, an input/output (I/O) circuit for performing communication with microcomputers on the outside, and a multiplexer (MPX) for selecting each signal to output it to the outside.

Because the present embodiment can provide logarithmic compression type AE output constructed with NPN transistors and CMOS type OP amps, a solid-state image pickup apparatus for distance measurement having a photometric function with a high performance at low costs can be realized. Although the AF sensors are preferably CMOS sensors produced in accordance with the CMOS process, similar advantages can be also obtained by the use of BASIS's, silicon intensified targets (SIT's), AMI's, CMD's, charge coupled devices (CCD's), or the like.

Embodiment 5

Figure 7:
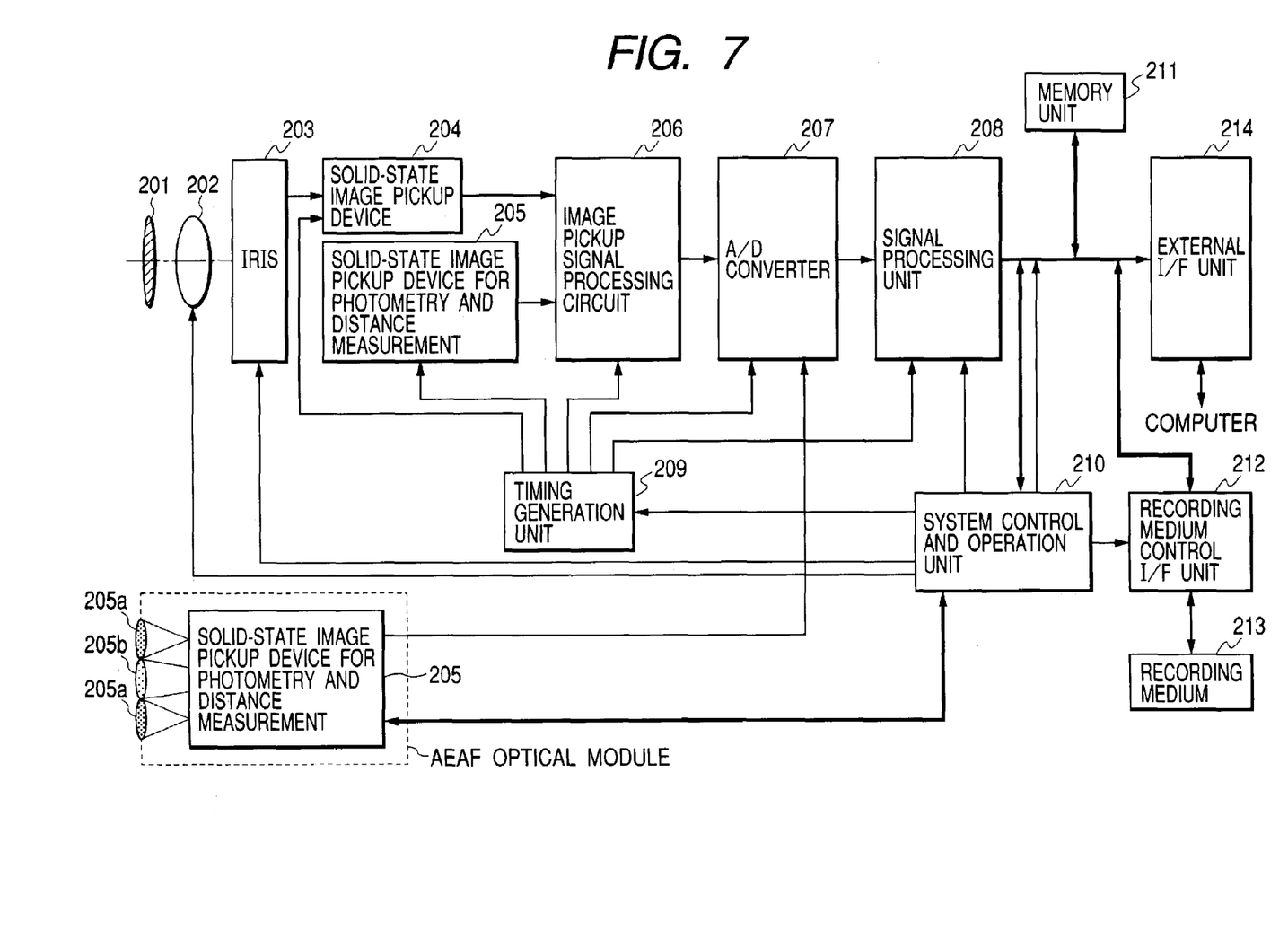
FIG. 7 is a diagram showing an image pickup device of a fifth embodiment according to the present invention.

An image pickup apparatus equipped with the solid-state image pickup device of the Embodiment 4 will be described. FIG. 7 is a block diagram showing a lens shutter digital compact camera (image pickup apparatus) of an embodiment. In FIG. 7, a reference numeral 201 designate a barrier used as both of a protector of a lens and a main switch; a reference numeral 202 designates the lens for imaging an optical image of an object on a solid-state image pickup device; a reference numeral 203 designates an iris for varying the quantity of the light which has passed through the lens 202; and a reference numeral 204 designates the solid-state image pickup device for picking up an object image formed through the lens 202 as an image signal.

Moreover, a reference numeral 205 designates the solid-state image pickup device for photometry and distance measurement described in connection with the above-mentioned Embodiment 4. Hereupon, a reference numeral 205a designates an AF circuit block for performing image formation of light onto the AF circuit block; and a reference numeral 205b designates an AE condenser lens for condensing light onto the photometry circuit block. A reference numeral 207 designates an analog/digital (A/D) converter for performing the analog/digital conversion of an image signal, a photometry signal, a distance measurement signal output from the solid-state image pickup devices 204 and 205; a reference numeral 208 designates a signal processing unit for performing various data correction and compression of the image data output from the A/D converter 207; a reference numeral 209 designates a timing generation unit for outputting various timing signals to the solid-state image pickup device 204, an image pickup signal processing circuit 206, the A/D converter 207, the signal processing unit 208, and the like; a reference numeral 210 designates a system control and operation unit for controlling various operations and the camera system; and a reference numeral 211 designates a memory unit for storing image data temporarily.

Furthermore, a reference numeral 212 designates an interface unit for performing recording to or reading from a recording medium; a reference numeral 213 designates the detachable recording medium such as a semiconductor memory and the like for the use of the recording or the reading of image data; and a reference numeral 214 designates an interface unit for communicating with an external computer and the like.

Next, the operation of the lens shutter digital compact camera described above at the time of photographing will be described. When the barrier 201 is opened, a main power supply is turned on. Successively, the power supply of control systems and the power supply of image pickup system circuits such as the A/D converter 207 and the like are turned on in order.

The system control and operation unit 210 performs the calculation of the distance to the object in accordance with the triangular distance measuring method on the basis of signals output from the AF circuit block of the solid-state image pickup device 205. After that, the feed quantity of the lens 202 is calculated, and the lens 202 is driven to a predetermined position to obtain in-focus state.

Next, in order to control exposure amount, a signal output from the AE sensor of the solid-state image pickup device 205 is converted by the A/D converter 207, and then the converted signal is input into the signal processing unit 208. Then, the system control and operation unit 210 executes the operation of exposure on the basis of the input data.

The system control and operation unit 210 judgers brightness on the result of the photometry, and adjust the iris 203 and a shutter speed according to the result of the judgment of brightness.

Subsequently, after the conditions of exposure are arranged, real exposure of the solid state image pickup device 204 begins. After the real exposure is completed, an image signal is output from the solid-state image pickup device 204. The output image signal is converted to a digital signal by the A/D converter 207, and then the converted digital signal is written in the memory unit 211 by the system control and operation unit 210 through the signal processing unit 208. After that, the data stored in the memory unit 211 is recorded in the detachable recording medium 213 under the control of the system control and operation unit 210 through the recording medium control I/F unit 212. Moreover, the data can be input into a computer or the like through the external I/F unit 214.

Incidentally, the solid-state image pickup device for photometry and distance measurement 205 of the present embodiment is applicable to a film-based camera and the like as well as the digital compact camera.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus, comprising:
   a photoelectric conversion element; and
   a logarithmic conversion unit which converts a signal from said photoelectric conversion element to a logarithmically compressed voltage by means of a diode characteristic of a p-n junction;
   wherein the p-n junction in said logarithmic conversion unit is arranged so as to include a bipolar transistor and wherein the p-n junction is formed either by emitter and base areas of the bipolar transistor with the collector area thereof connected to a fixed voltage, or by collector and base areas of the bipolar transistor with the emitter area thereof connected to a fixed voltage, and wherein the said collector area or said emitter area, connected to said fixed voltage, is provided in common to a semiconductor substrate.

2. A photoelectric conversion apparatus according to claim 1, wherein said photoelectric conversion element and said logarithmic conversion unit are formed on the same semiconductor substrate in accordance with a CMOS process.

3. A photoelectric conversion apparatus, comprising:
   a photoelectric conversion element; and
   a logarithmic conversion unit which converts a current from said photoelectric conversion element to a logarithmically compressed voltage,
   wherein said logarithmic conversion unit performs logarithmic conversion by means of a diode characteristic of a diode in a bipolar transistor, the diode being formed either by emitter and base areas of the bipolar transistor with the collector area thereof connected to a fixed voltage, or by collector and base areas of the bipolar transistor with the emitter area thereof connected to a fixed voltage, wherein the said collector area or said emitter area, connected to said fixed voltage, is provided in common to a semiconductor substrate, and wherein said photoelectric conversion element and said logarithmic compression unit are formed on the same semiconductor substrate in accordance with a CMOS process.

4. A photoelectric conversion apparatus, comprising:
   a photoelectric conversion element;
   a logarithmic conversion unit which converts a signal from said photoelectric conversion element to a logarithmically compressed voltage by using a characteristic of a diode formed by a p-n junction;
   an inversion element which inverts a polarity of an output from said logarithmic conversion unit; and
   a correction element which corrects a diode characteristic of a p-n junction in said photoelectric conversion element,
   wherein said logarithmic conversion unit is arranged so as to include a bipolar transistor, wherein the said collector area or said emitter area, connected to said fixed voltage, is provided in common to a semiconductor substrate, and wherein the p-n junction that provides the diode characteristic used by the logarithmic conversion unit is formed either by emitter and base areas of the bipolar transistor with the collector area thereof connected to a fixed voltage, or by collector and base areas of the bipolar transistor with the emitter area thereof connected to a fixed voltage.

5. A photoelectric conversion apparatus according to claim 4, wherein said correction element perform correction of a reverse direction saturation current of a p-n junction transistor for performing logarithmic compression.

6. A photoelectric conversion apparatus according to claim 4, wherein said inversion element includes an inversion amplification circuit having a gain of −1.

7. A photoelectric conversion apparatus according to claim 4, wherein said photoelectric conversion element, said logarithmic conversion unit, said inversion element and said correction element are formed on a same semiconductor substrate in accordance with a CMOS process.

8. An image pickup apparatus, comprising: a photoelectric conversion apparatus according claim 1;
   a solid-state image pickup element which picks up an object image;
   an operation circuit which executes an operation for photometry on a signal from said photoelectric conversion apparatus, and for controls of exposure of said solid-state image pickup element on the basis of an operation result; and
   a signal processing circuit which processes a signal from said solid-state image pickup element.

9. A photoelectric conversion apparatus according to any one of claims 1, 3, and 4, wherein said semiconductor substrate is electrically coupled to a voltage source supplying the fixed voltage.

* * * * *

UNITED STATES PATENT AND TRADEMARK OFFICE
CERTIFICATE OF CORRECTION

PATENT NO. : 7,078,668 B2
APPLICATION NO. : 10/360927
DATED : July 18, 2006
INVENTOR(S) : Kazuo Yamazaki et al.

It is certified that error appears in the above-identified patent and that said Letters Patent is hereby corrected as shown below:

COLUMN 3

Line 31, "FIG. 2" should read --FIG. 2 is--.

COLUMN 5

Line 13, "designates" should read --designate--; and
Line 29, "an" should read --a--.

COLUMN 6

Line 16, "an" should read --a--; and
Line 20, "corresponding to" should be deleted.

COLUMN 7

Line 63, "designate" should read --designates--.

COLUMN 8

Line 58, "adjust" should read --adjusts--.

COLUMN 9

Line 24, "junction;" should read --junction,--.

UNITED STATES PATENT AND TRADEMARK OFFICE
CERTIFICATE OF CORRECTION

PATENT NO. : 7,078,668 B2
APPLICATION NO. : 10/360927
DATED : July 18, 2006
INVENTOR(S) : Kazuo Yamazaki et al.

It is certified that error appears in the above-identified patent and that said Letters Patent is hereby corrected as shown below:

COLUMN 10

Line 27, "perform" should read --performs--.

Signed and Sealed this

Sixteenth Day of January, 2007

JON W. DUDAS
*Director of the United States Patent and Trademark Office*